(12) United States Patent
Matsuda

(10) Patent No.: US 8,861,934 B2
(45) Date of Patent: *Oct. 14, 2014

(54) APPARATUS, METHOD, AND MEDIUM STORING A PROGRAM, THAT REDUCE PLAYBACK TIME DIFFERENCES WHEN JOINING MOVING IMAGES OF DIFFERENT FORMATS

(75) Inventor: Araki Matsuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 172 days.

This patent is subject to a terminal disclaimer.

(21) Appl. No.: 13/396,915

(22) Filed: Feb. 15, 2012

(65) Prior Publication Data

US 2012/0207450 A1 Aug. 16, 2012

Related U.S. Application Data

(63) Continuation of application No. 11/847,525, filed on Aug. 30, 2007, now Pat. No. 8,139,920.

(30) Foreign Application Priority Data

Aug. 30, 2006 (JP) ................................ 2006-233994

(51) Int. Cl.
```
H04N 5/765    (2006.01)
H04N 5/85     (2006.01)
G11B 20/10    (2006.01)
H04N 5/781    (2006.01)
G11B 27/034   (2006.01)
H04N 9/804    (2006.01)
G11B 20/12    (2006.01)
```

(52) U.S. Cl.
CPC ................ *G11B 27/034* (2013.01); *H04N 5/85* (2013.01); *G11B 20/10* (2013.01); *H04N 5/781* (2013.01); *H04N 5/765* (2013.01); *H04N 9/8042* (2013.01); *G11B 20/1262* (2013.01); *G11B 2020/10537* (2013.01)
USPC .......................................................... 386/278

(58) Field of Classification Search
USPC .................................. 386/284, 278, 280, 283
See application file for complete search history.

(56) References Cited

U.S. PATENT DOCUMENTS

| 6,944,390 B1 | 9/2005 | Eubanks |
| 8,139,920 B2 * | 3/2012 | Matsuda ....................... 386/284 |
| 2005/0201724 A1 | 9/2005 | Chu |

FOREIGN PATENT DOCUMENTS

JP        2004-104361 A        4/2004

* cited by examiner

*Primary Examiner* — David Harvey
(74) *Attorney, Agent, or Firm* — Rossi, Kimms & McDowell LLP

(57) ABSTRACT

Moving image editing device, method, and storage medium storing a program provide a smart rendering scheme to minimize the variation of playback time, even when editing moving image data that does not match the save format. The format of the moving image data is compared with the save format. The moving image data is converted into the save format. The moving image data is sequentially joined and saved. A portion or the entirety of the moving image data itself is output if the format of the moving image data matches the save format, or the data encoded into the save format after decoding a portion or the entirety of the moving image data is output if the format of the moving image data does not match the save format. The device repeats sequential joining so that the difference in the playback time with the moving image data is minimized.

6 Claims, 9 Drawing Sheets

APPARATUS, METHOD, AND MEDIUM STORING A PROGRAM, THAT REDUCE PLAYBACK TIME DIFFERENCES WHEN JOINING MOVING IMAGES OF DIFFERENT FORMATS

CROSS REFERENCE

This is a continuation of U.S. patent application Ser. No. 11/847,525 filed 30 Aug. 2007, the entire content of which is herein incorporated by reference.

BACKGROUND OF THE INVENTION

1. Field of the Invention

The present invention relates to a moving image editing device and method, and a storage medium.

2. Description of the Related Art

Digital video cameras, and digital cameras with a function for shooting moving images are becoming widely available, and opportunity to handle moving image data in ordinary households and businesses is on the rise. Accordingly, an interest in moving image editing, which edits and saves moving image data, is growing, and various moving image editing applications are on the market.

Many moving image editing applications, which are typified by Microsoft's Movie Maker™ and Adobe's Premiere™, provide a function for arbitrarily joining together a portion of a plurality of material data to generate a single moving image data. When the save data is generated from a plurality of material data, such a moving image editing application achieves generation of save data by decoding all material data and re-encoding them into a predetermined moving image format.

However, since, in this edit/save method, all material data have to be decoded and re-encoded, there are problems that it takes much time to generate save data, and image quality is degraded every time editing is repeated.

As techniques to solve these problems, sometimes an edit/save method called a smart rendering is used. The smart rendering is a technique that, when a save format matches the moving image format of the material data, decoding and re-encoding are not performed, but the material data is used directly as save data.

According to this edit/save method, time required for decoding and re-encoding, which accounts for a large percentage of time required for saving the result of editing, can be reduced. In addition, the smart rendering has the advantage that the image quality is not degraded even if the same moving image signal is edited repeatedly because the material data does not have to be re-encoded.

As a moving image editing technique that uses a smart rendering, a technique is described in Japanese Laid-Open Patent Publication (Kokai) No. 2004-104361. This prior art is a technique for applying a smart rendering even if there is material data whose format does not match the save format in a moving image editing device. This prior art will be described below with reference to FIG. 9.

FIG. 9 shows an overview of a moving image editing device that outputs moving image data in an MPEG format.

In FIG. 9, the moving image editing device comprises an AVI importer (decoder) 902 and an MPEG importer 903, which are decoding devices for decoding material data compressed and encoded in an AVI format and in an Moving Picture Experts Group (MPEG) format, respectively.

The moving image editing device also comprises a video editing control program 901, which is a data editing device for arbitrarily joining together a portion or all of a plurality of material data decoded by these importers to generate edited edit data.

The moving image editing device also comprises an MPEG compiler (encoder) 904 for generating and outputting output moving image data in which the material data corresponding to the edit data edited by the video editing program 901 was encoded into a target MPEG format.

In this moving image editing device, when a plurality of partial data that constitute the edit data have the same format as the target MPEG format, the MPEG compiler 904 does not decode the material data corresponding to the partial data, but uses them directly to generate output moving image data.

The above prior art achieves a sophisticated smart rendering with a method that decodes only material data whose format does not match a save format, and converts obtained baseband data into the save format, then joins the material data to the remaining material data. In the above prior art, a format indicates an encoding scheme such as a Motion-JPEG and an MPEG, a bit rate and an image size.

However, in the above prior art, the variation of playback time when the material data is converted into the save format has not been mentioned. Moving image data has a minimum time unit that can edit and save the data. For example, the unit corresponds to a frame for a Motion-JPEG and Group Of Picture (GOP) for an MPEG.

As described above, moving image data has different minimum time units depending on frame rates and encoding schemes. Accordingly, when the material format and the save format are different, the format conversion rounds the playback time of the material data to the minimum time unit in the save format.

For example, a case is considered, in which a 29.97 fps Motion-JPEG serving as material data is converted as a 30 fps Motion-JPEG save data. In this case, since the frame rate of the save data is not an integral multiple of the frame rate of the material data, the material data is rounded to 30 fps by conversion, therefore, a difference in the playback time arises.

Particularly, since when a large number of material data are edited and saved into single save data, the difference arises for each material data, a problem arises, of differences accumulating in the save data, deviating considerably from the original playback time of the material data.

SUMMARY OF THE INVENTION

The present invention provides a moving image editing device and method, and a storage medium, which uses a smart rendering scheme whereby the variation of playback time is minimized even when editing material data with a minimum time unit that does not match that of the save format.

In a first aspect of the present invention, there is provided a moving image editing device which edits and saves a plurality of moving image data as material data, comprising: a material format acquisition unit adapted to acquire a material format which is a moving image format of the material data; a format determination unit adapted to determine whether or not the material format acquired by the material format acquisition unit matches a save format which is the moving image format to be saved; a format conversion unit adapted to convert the material data into the save format; and a joining unit adapted to sequentially join the moving image data acquired by the format conversion unit and generate the moving image data which is the save result, wherein the format conversion unit is adapted to output a portion or the entirety of the material data itself regarding the material data determined to be matched by the format determination unit, on the other hand, output data encoded into the save format after decoding a portion or the entirety of the material data regarding the material data determined not to be matched, and the joining unit is adapted to repeat sequential joining so that the difference in the playback time with the material data may be minimized.

The moving image editing device can further comprises an effect instruction unit adapted to give an instruction to add a video effect and an audio effect to any portion or the entirety of the material data, and the format conversion unit can decode the portion instructed by the effect instruction unit regardless of the determination result by the format determination unit, add the effect instructed by the effect instruction unit, then encode the portion into the save format and outputs the portion.

The joining unit can detect a difference between the playback time of a conversion result acquired by the format conversion unit and the playback time of the material data when performing sequential joining, and select the joining portion of the conversion result so that the difference is equal to or less than one frame duration in the save format.

The joining unit can detect a difference between the playback time of a conversion result acquired by the format conversion unit and the playback time of the material data when performing sequential joining, and select the joining portion of the conversion result so that the difference is equal to or less than one GOP duration in the save format.

In a second aspect of the present invention, there is provided a moving image editing method which edits and saves a plurality of moving image data as material data, comprising: a material format acquisition step of acquiring a material format which is a moving image format of the material data; a format determination step of determining whether or not the material format acquired at the material format acquisition step matches a save format which is the moving image format to be saved; a format conversion step of converting the material data into the save format; and a joining step of sequentially joining the moving image data acquired at the format conversion step and generating the moving image data which is the save result, wherein the format conversion step comprises outputting a portion or the entirety of the material data itself regarding the material data determined to be matched at the format determination step, on the other hand, outputting data encoded into the save format after decoding a portion or the entirety of the material data regarding the material data determined not to be matched, and the joining step comprises repeating sequential joining so that the difference in the playback time with the material data may be minimized.

The moving image editing method can further comprises an effect instruction step of giving an instruction to add a video effect and an audio effect to any portion or the entirety of the material data, and the format conversion step can comprise decoding the portion instructed by the effect instruction step regardless of the determination result by the format determination step, adding the effect instructed by the effect instruction step, then encoding the portion into the save format and outputs the portion.

The joining step can comprise detecting a difference between the playback time of a conversion result acquired at the format conversion step and the playback time of the material data when performing sequential joining, and selecting the joining portion of the conversion result so that the difference is equal to or less than one frame duration in the save format.

The joining step can comprise detecting a difference between the playback time of a conversion result acquired at the format conversion step and the playback time of the material data when performing sequential joining, and selecting the joining portion of the conversion result so that the difference is equal to or less than one GOP duration in the save format.

In a third aspect of the present invention, there is provided a computer readable storage medium storing a moving image editing program which causes a computer to execute a moving image editing method of editing and saving a plurality of material data as material data, wherein the moving image editing method comprises: a material format acquisition step of acquiring a material format, which is the moving image format of the material data; a format determination module step of determining whether or not the material format acquired at the material format acquisition step matches the save format which is the moving image format to be saved; a format conversion step of converting the material data into the save format; and a joining step of sequentially joining the moving image data acquired at the format conversion module and generate the moving image data, which is the save result, wherein the format conversion step comprises outputting a portion or the entirety of the material data itself regarding the material data determined to be matched at the format determination module, on the other hand, outputting data encoded into the save format after decoding a portion or the entirety of the material data regarding the material data determined not to be matched, and the joining module comprises repeating sequential joining so that the difference in the playback time with the material data may be minimized.

Further features of the present invention will become apparent from the following description of exemplary embodiments with reference to the attached drawings.

DETAILED DESCRIPTION OF THE PREFERRED EMBODIMENTS

Embodiments of the present invention will be descried in detail below with reference to the drawings.

The embodiments that will be described below is examples of a device for realizing the present invention, and should be corrected or modified as appropriate depending on the configuration of a system to which the present invention is applied, and various conditions, therefore the present invention is not limited to the following embodiments.

Figure 1:
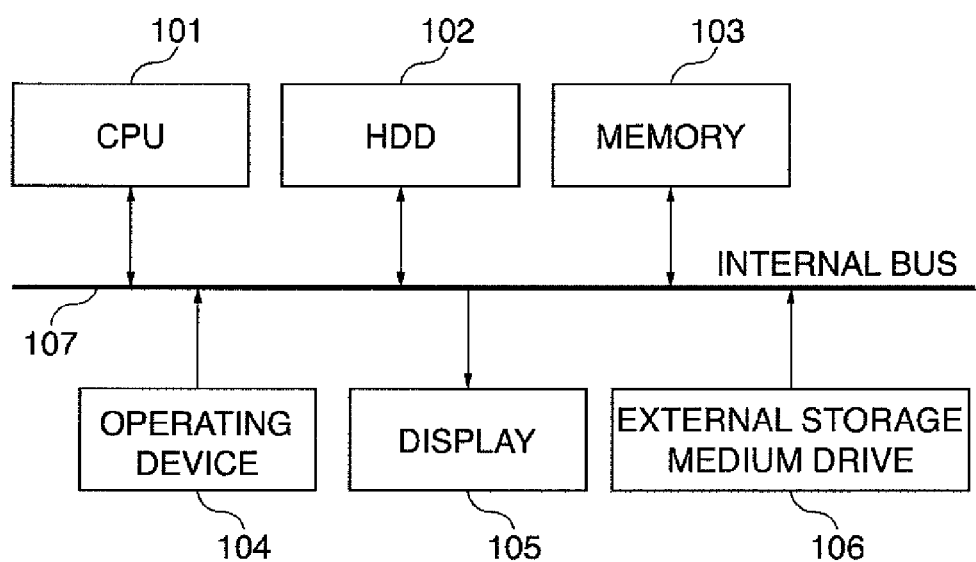
FIG. 1 is a diagram schematically showing the hardware configuration of a moving image editing device according to an embodiment of the present invention.

FIG. 1 is a diagram schematically showing the hardware configuration of a moving image editing device according to an embodiment of the present invention.

In FIG. 1, a moving image editing device is constituted by a personal computer (PC).

A central processing unit (CPU) 101 controls the operation of editing/saving processing. A hard disk drive 102 records an executable program and digital data such as encoded moving image data in a readable format. A program code and target image data recorded on the hard disk drive 102 are loaded into a memory device 103.

An operating unit 104 is constituted by a keyboard, a mouse, or the like, and is an input unit for a transfer operation. The input is detected by the CPU 101, and notified to a program loaded into the memory device 103, then processing is performed.

A display unit (display) 105 is a CRT display, a liquid crystal panel, or the like, and displays the progress of transfer, and decoded moving image signals. An external storage medium drive 106 is for reading an external storage medium such as a CD-ROM and a DVD-ROM. Each unit described above is connected by an internal bus 107.

Although the present embodiment uses the moving image data recorded on the hard disk drive 102, the moving image data may be executed through the external storage medium drive 106 when the moving image data is recorded on the external storage medium. Similarly, the present invention is also applied to an embodiment in which the moving image data is loaded through a network.

In the present embodiment, a save data format is a Motion-JPEG, which has no inter-frame correlation. However, even in the save data format, which has inter-frame correlation, such as MPEG, the present invention is applied by taking a frame in a Motion-JPEG as an editable and savable minimum time unit such as GOP.

Figure 2:
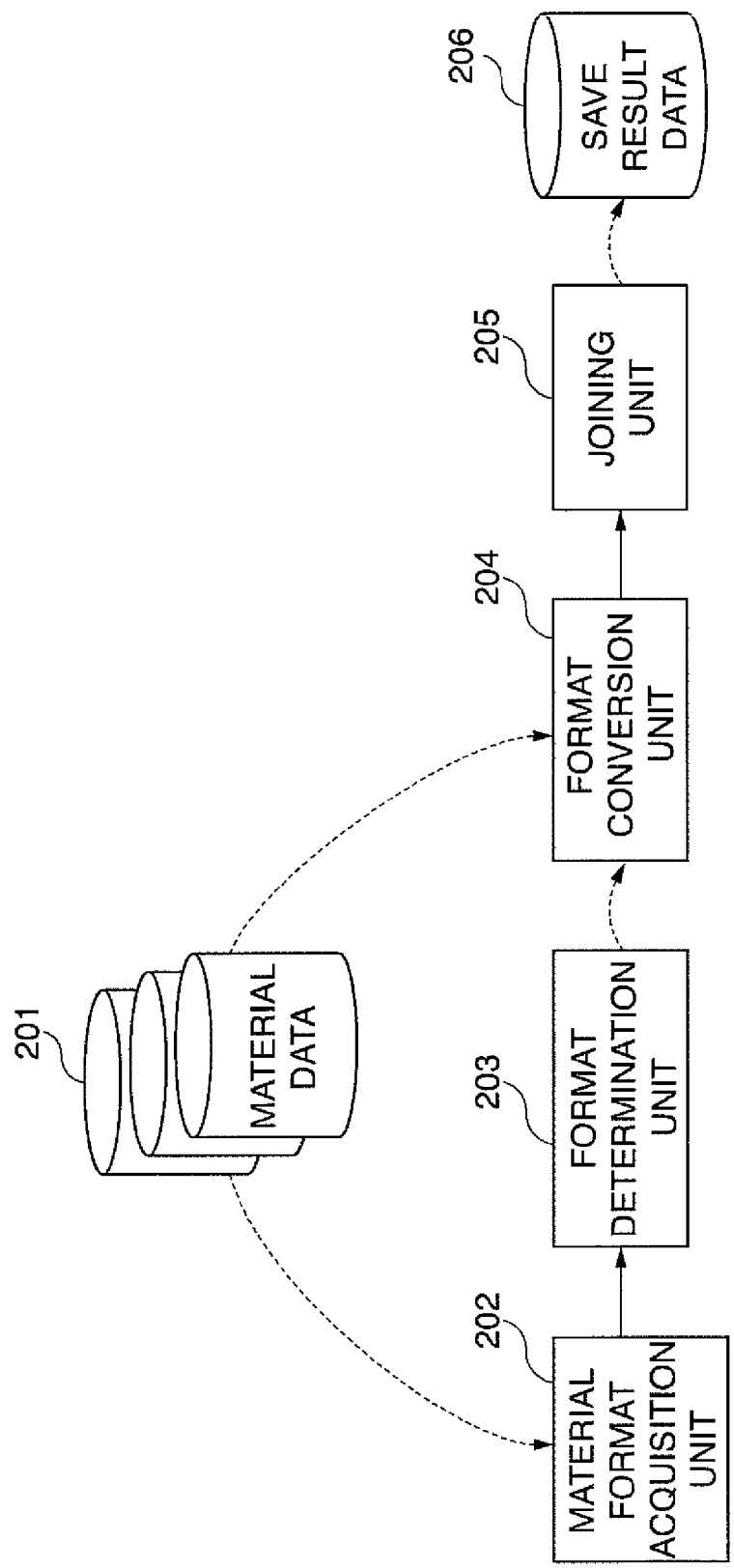
FIG. 2 is a diagram schematically showing the function block of a moving image editing device according to a first embodiment of the present invention.

FIG. 2 is a diagram schematically showing the function block of a moving image editing device according to a first embodiment of the present invention.

In FIG. 2, two or more material data 201 to be edited can be entered. When two or more material data are entered, each material data 201 is entered successively. A material format acquisition unit 202 acquires the moving image format of the material data 201 material data by material data.

The moving image format acquired by the material format acquisition unit 202 is an encoding scheme, an image size, a frame rate, an audio encoding scheme, an audio bit rate, an audio channel number, and an audio sampling rate.

A format determination unit 203 determines whether or not a material format acquired by the material format acquisition unit 202 and a save format completely match. A format conversion unit 204 refers to the determination result of the format determination unit 203, converts the material data 201 into the moving image data in the save format, and outputs the data.

A joining unit 205 sequentially joins the moving image data outputted from the format conversion unit 204 and generates save result data 206.

Next, the format determination unit 203 in FIG. 2 will be described with reference to FIGS. 3 and 4. The format determination unit 203 performs format determination on each of a video portion and an audio portion.

Figure 3:
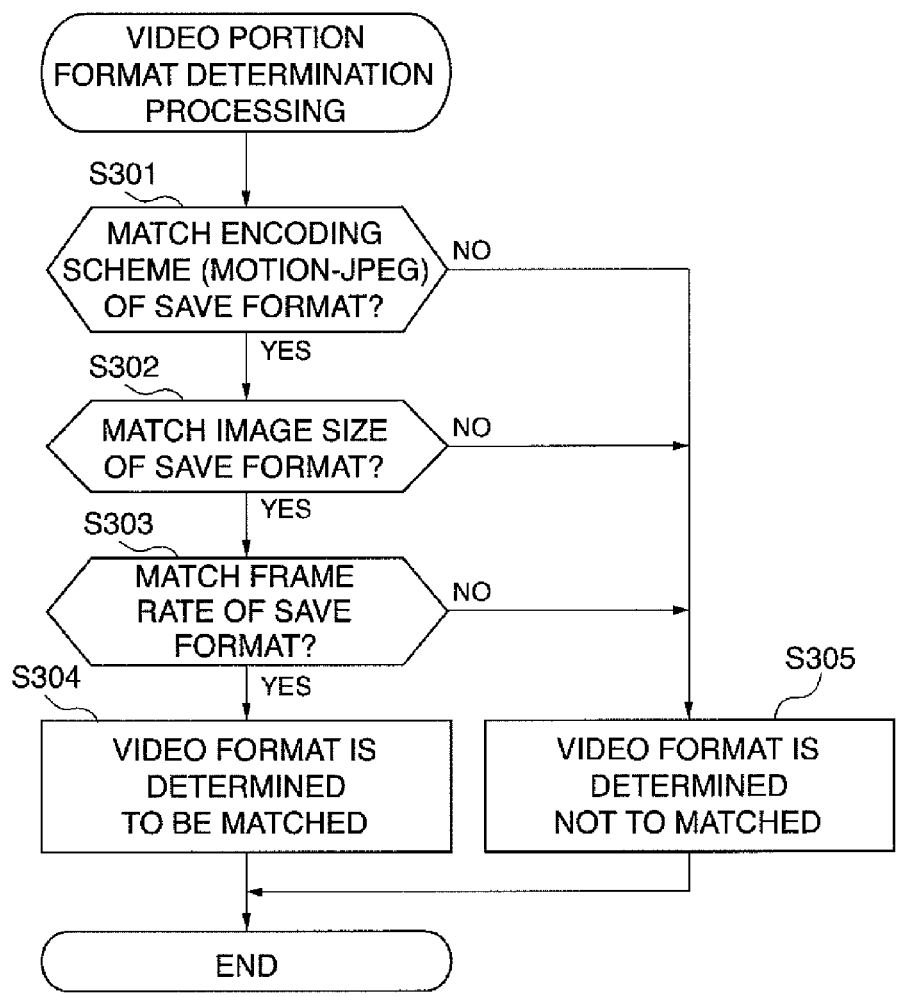
FIG. 3 is a flowchart showing the procedure of video portion format determination processing performed by a format determination unit in FIG. 2.
Figure 4:
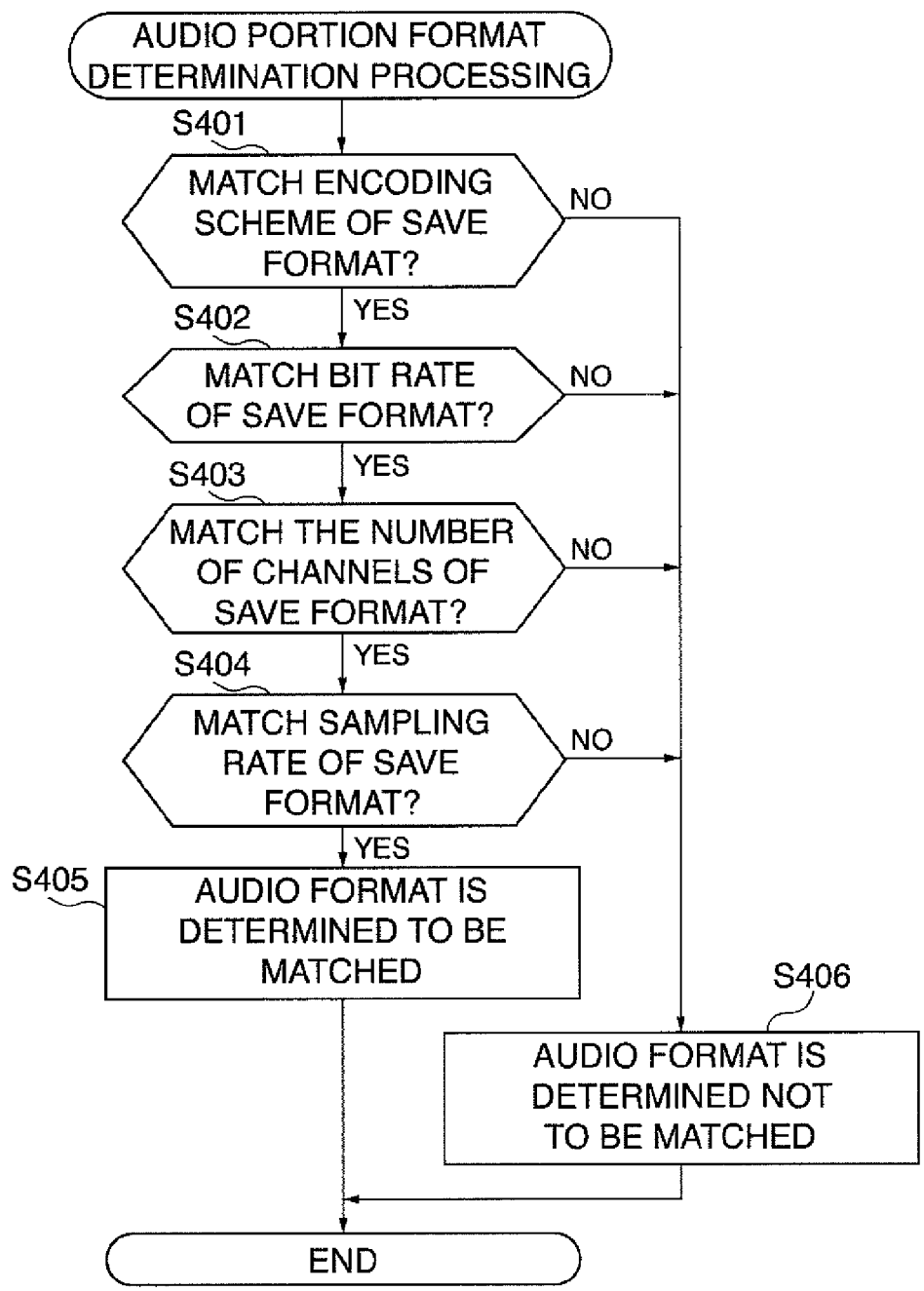
FIG. 4 is a flowchart showing the procedure of audio portion format determination processing performed by the format determination unit in FIG. 2.

Moreover, the flow of the format determination of one material data is described in FIGS. 3 and 4, and when two or more material data are handled, this processing is repeated by the number of material data.

FIG. 3 is a flowchart showing the procedure of video portion format determination processing performed by a format determination unit in FIG. 2.

In FIG. 3, it is determined whether or not the encoding scheme of the video portion of the material data matches the save format in step S301. Similarly, in steps S302 and S303, regarding the video portion of the material data, it is determined whether or not the image size and the frame rate match the save format.

If a no-match is determined in any of steps S301, S302 and S303, the processing proceeds to step S305, and the video format is determined to be a mismatch. On the contrary, if a match is determined in all of steps, the processing proceeds to step S304, and the video format is determined to be matched, followed terminating the processing.

FIG. 4 is a flowchart showing the procedure of audio portion format determination processing performed by the format determination unit in FIG. 2.

In FIG. 4, whether or not the encoding scheme of the audio portion of the material data matches the save format is determined in step S401. Similarly, in steps S402, S403, and S404, regarding the audio portion of the material data, whether or not the bit rate, the number of channels, and the sampling rate match the save format is determined.

If a no-match is determined in any of steps S401, S402, S403 and S404, the processing proceeds to step S406, and the audio format is determined to be a mismatch. On the contrary, if a match is determined in all of steps, the processing proceeds to step S405, and the audio format is determined to be matched. Then the processing is terminated.

Next, the format conversion unit 204 in FIG. 2 will be described. The format conversion unit 204 separately processes the video portion and the audio portion of the material data according to the determination result of the format determination unit 203. Since the processing flows on the video portion and the audio portion are almost the same, only the processing on the video portion will be described in details with reference to FIG. 5.

Figure 5:
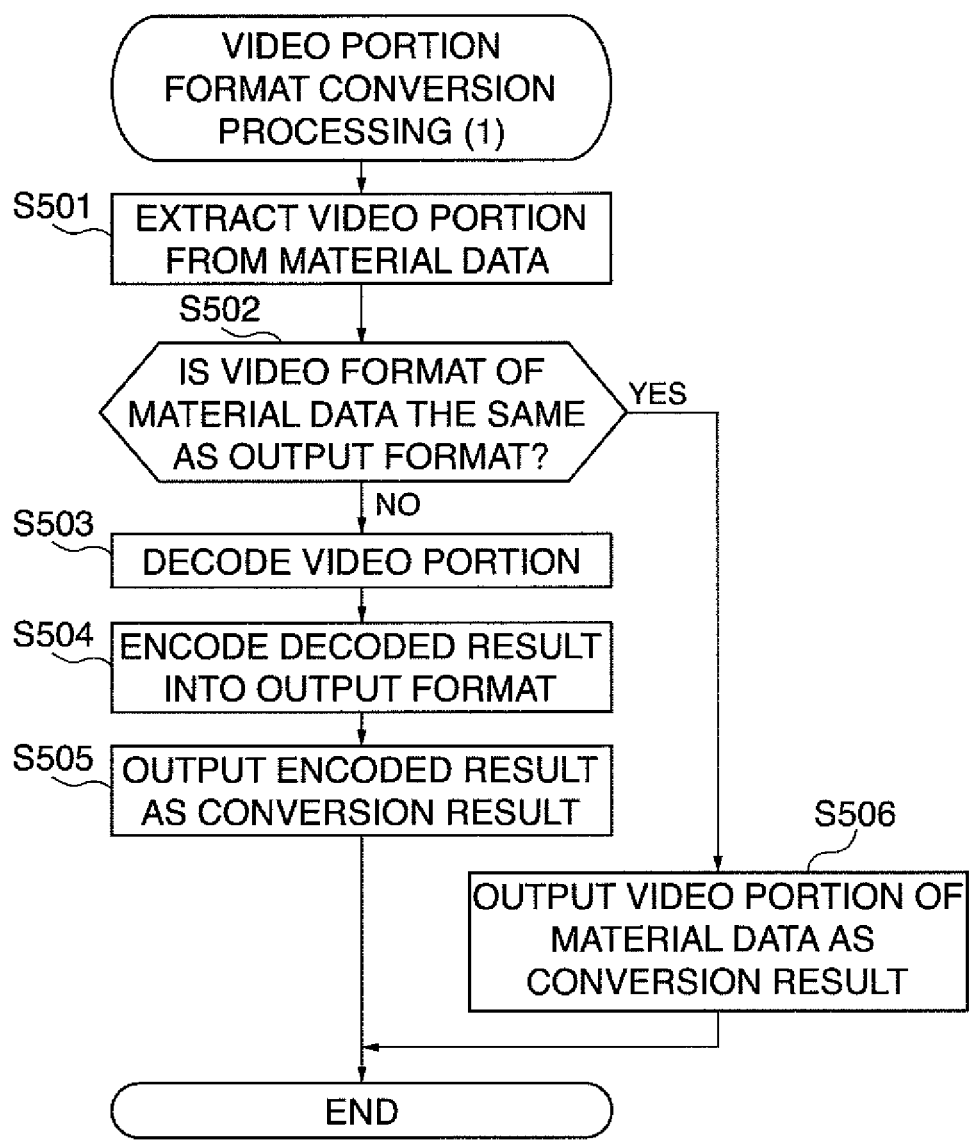
FIG. 5 is a first flowchart showing the procedure of video portion format conversion processing performed by a format conversion unit in FIG. 2.

In FIG. 5, a flow in which one of the material data is entered, and converted into a save format is shown; when a plurality of material data are handled, the processing is repeated by the number of material data.

FIG. 5 is a first flowchart showing the procedure of video portion format conversion processing performed by the format conversion unit in FIG. 2.

In FIG. 5, in step 501, only a video portion is extracted from the material data. Successively, in step S502, the processing branches using the determination result of the format determination unit 203.

When it is determined that the format of the video portion of the material data does not match the save format, the processing proceeds to step S503, otherwise, the processing proceeds to step S506.

In step S503, the data of the video portion extracted in step S501 is decoded to generate baseband data. In step S504, the baseband data generated in step S503 is encoded so as to match the save format. Here, the types of formats to match are an encoding scheme, an image size, and a frame rate, as described above.

In the encoding in step S504, when encoding is performed with a frame rate that is different from that of the material data, sometimes the minimum time unit may change, and moving image data with a different playback time than that of the material data may be generated. In this case, by generating moving image data in which the final frame is repeated twice, moving image data having the playback time equal to or longer than that of the material data is generated.

In step S505, the encoding result in step S504 is outputted as the result of the format conversion. In addition, in step S506, the video portion itself of the material data is outputted as the format conversion result, followed by terminating the processing.

With the above procedure, when the format of the video portion of the material data matches the save format, the video portion itself of the material data can be outputted, and otherwise, decoding and encoding are performed to generate and output the moving image data in the save format.

Moreover, in Steps S503 and S506, the processing can be performed on any portion or the entirety of the material data. In addition, the same processing is additionally performed on the audio portion. However, although the original minimum time unit of the audio portion is finer than that of the video portion, processing is performed so as to match the minimum time unit of the save format of the video portion.

This allows the playback time to be the same for the audio portion and the video portion, thus allowing the difference in the playback time with the material data to be confined to less than one frame.

Next, the joining unit 205 in FIG. 2 will be described. The joining unit 205 joins the format conversion results of the video portion and the audio portion of each material data, which are outputted from the format conversion unit 204, to generate save data.

As described above, since the playback time of the format conversion result may have changed compared with the material data, the joining unit 205 detects this difference and performs adjustments so that the difference between the entirety of the save data and the entirety of material data becomes less than one frame.

Figure 6:
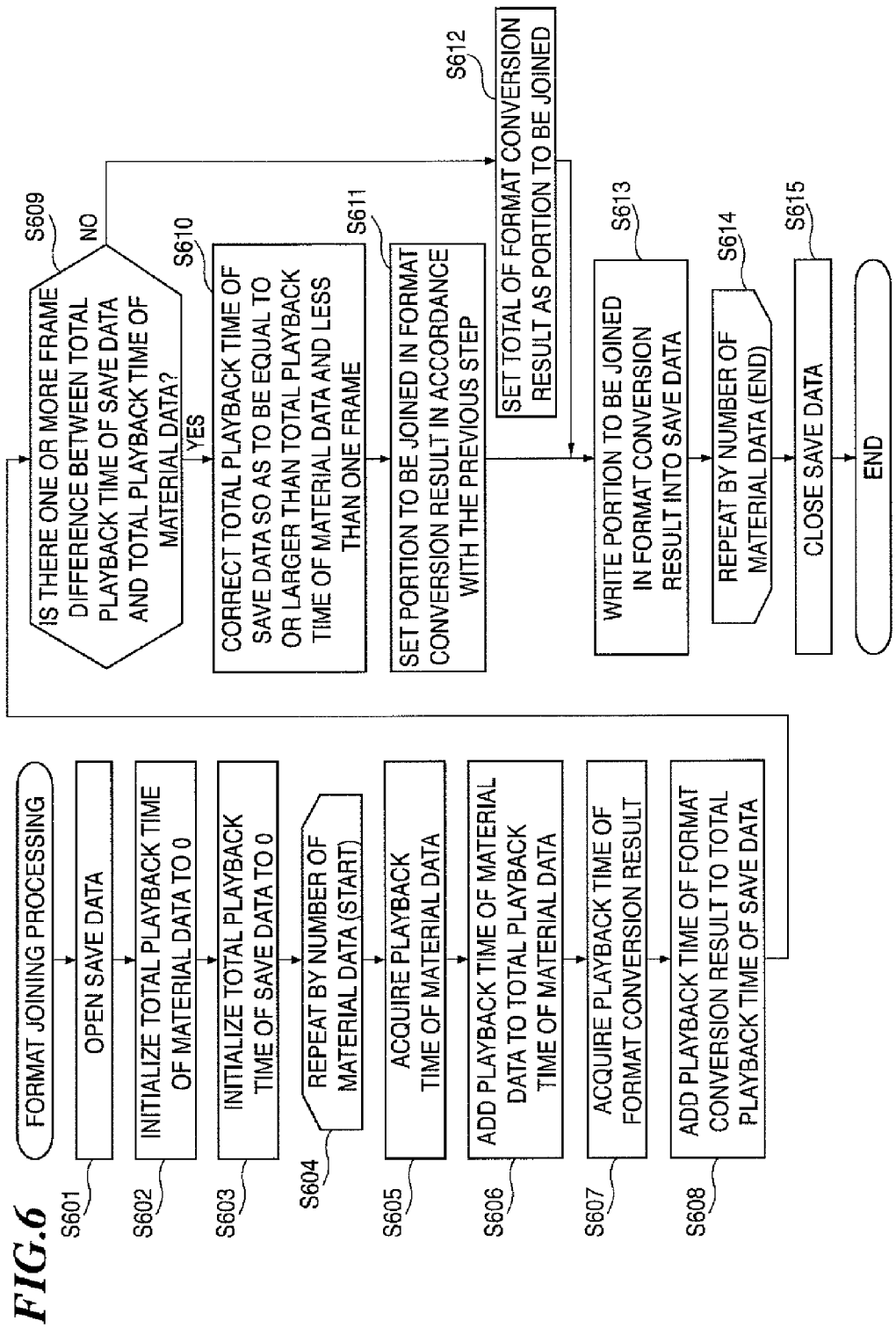
FIG. 6 is a flowchart showing the procedure of format joining processing performed by a joining unit in FIG. 2.

FIG. 6 is a flowchart showing the procedure of format joining processing performed by the joining unit in FIG. 2.

In FIG. 6, the save data is opened in step S601. In steps S602 and S603, the total playback time of the material data and the save data is initialized to 0.

The total playback time is used to detect the difference between the playback time of the material data and that of the save data generated by the joining unit 205.

Steps S604 and S614 indicate that the processing of steps S605 to S613 is repeatedly executed by the number of material data. In step S605, the playback time of the material data is acquired. When only a portion of the material data is to be saved, the playback time of the portion to be saved is acquired.

In step S606, the playback time of the material data acquired in Step S605 is added to the total playback time of the material data. In step S607, the playback time of the format conversion result outputted from the format conversion unit 204 is acquired. In step S608, the playback time of the format conversion result acquired in step S607 is added to the total time of the save data.

In step S609, the total playback time of the material data updated in step S606 is compared with the total playback time of the save data updated in step S608. As a result of comparison, if the total playback time of the save data is determined to be one or more frame longer, the processing proceeds to step S610. On the contrary, when it is determined that the difference is less than one frame, the processing proceeds to step S612.

In step S610, the total playback time of the save data is corrected so as to be equal to or longer than the total time of the material data, and so that the difference is less than one frame. Additionally, in subsequent Step S611, a portion to be joined is set in the format conversion result.

Here, in order to match a target to be actually saved with the corrected content in step S610, in the format conversion result, the remaining of the subtraction of the playback time corrected in step S610 from the end portion is set as the portion to be joined.

In step S612, the entirety of the format conversion result is set as the portion to be joined.

In step S613, the portion to be joined, which was set in step S611 or S612, is saved as save data. Processing so far is performed repeatedly by the number of material data, and finally, the save data is closed in step S615, followed by terminating the processing.

In the joining unit 205, performing the save processing according to the above processing procedure allows the difference in playback time with the material data to be confined to less than one frame, even if results from the format conversion of a plurality of material files are joined.

The above processing is performed sequentially, thus allowing the smart rendering to be provided whereby the variation of the playback time is minimized even when editing the material data with a minimum time unit that does not match that of the save format.

Also, in a second embodiment of the present invention, the format of the moving image data to be edited is a Motion-JPEG, which has no inter-frame correlation.

Figure 7:
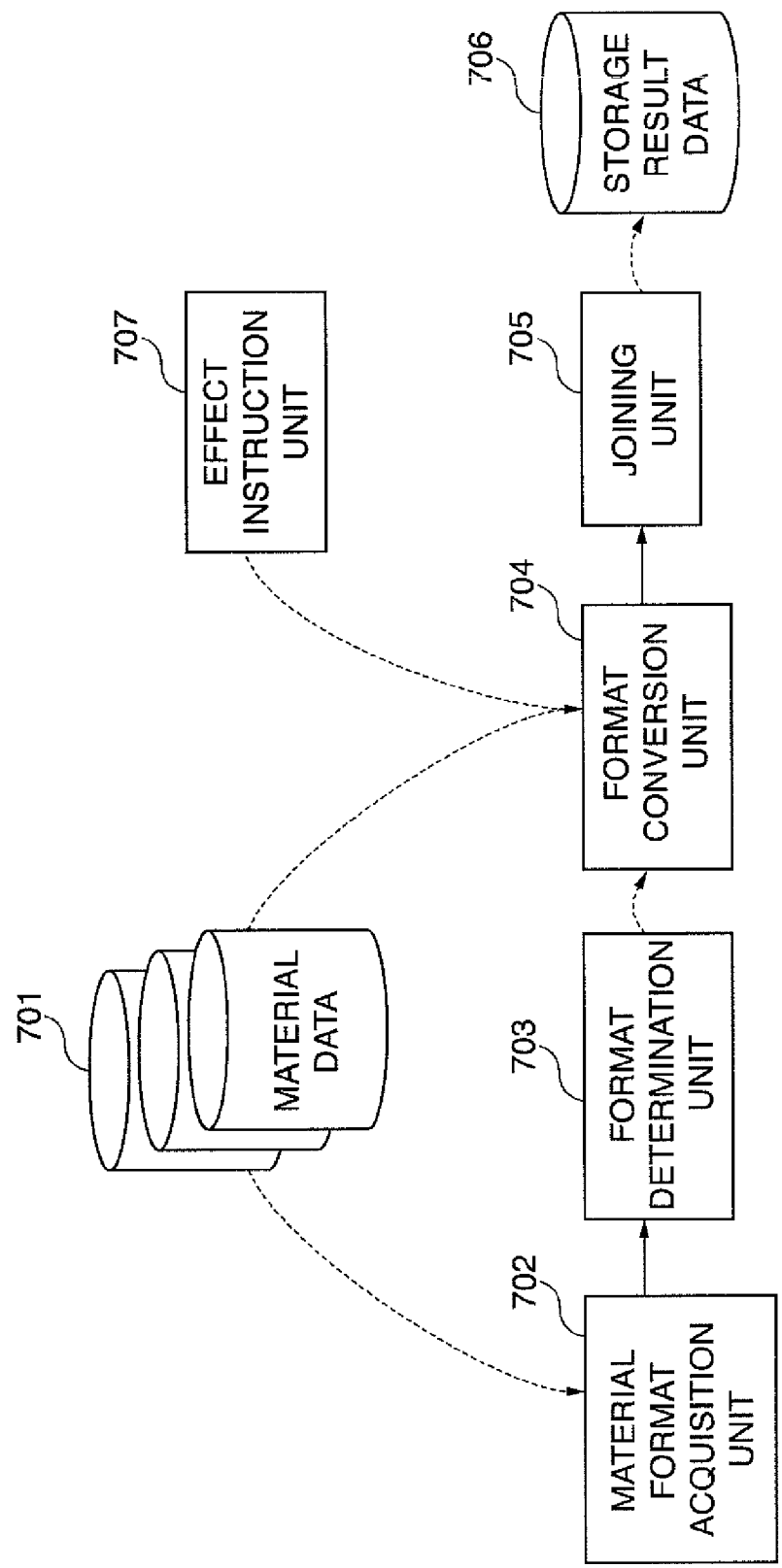
FIG. 7 is a diagram schematically showing the function block of a moving image editing device according to a second embodiment of the present invention.

FIG. 7 is a diagram schematically showing the function block of a moving image editing device according to a second embodiment of the present invention.

In FIG. 7, two or more material data 701 to be edited can be entered. When two or more material data 701 are entered, each material data is entered successively. A material format acquisition unit 702 acquires the moving image format of the material data 701 material data by material data. The moving image format acquired by the material format acquisition unit 702 is an encoding scheme, an image size, a frame rate, an audio encoding scheme, an audio bit rate, an audio channel number, and an audio sampling rate.

An effect instruction unit 707 can give an instruction to add a video effect and an audio effect to any portion or the entirety of the material formats. Although this instruction is separately performed on the video effect and the audio effect, both the minimum time units to be added conform to the minimum time unit of the video portion. A video effect includes a rotational effect, a partial enlargement effect, and an adjustment effect such as brightness and contrast. An audio effect includes fade-in and fade-out.

A format determination unit 703 determines whether or not a material format acquired by the material format acquisition unit 702 and a save format completely match, and whether or not the effect instruction unit 707 gave an effect instruction. This determination is separately performed on the video portion and the audio portion of the material data.

A format conversion unit 704 refers to the determination result of the format determination unit 703 to reflect the video effect and the audio effect instructed by the effect instruction unit 707 in the material data 701, which is then converted into the moving image in the save format and outputted. A joining unit 705 sequentially joins the moving image data outputted from the format conversion unit 704 and generates save result data 706.

The format determination unit 703 is for performing format determination on each of the video portion and the audio portion, and the function and the operation thereof are the same as those of the format determination unit 203 described in the first embodiment.

Next, the format conversion unit 704 will be described. The format conversion unit 704 separately processes the video portion and the audio portion of the material data according to the determination result of the format determination unit 703 and the instruction of the effect instruction unit 707.

Figure 8:
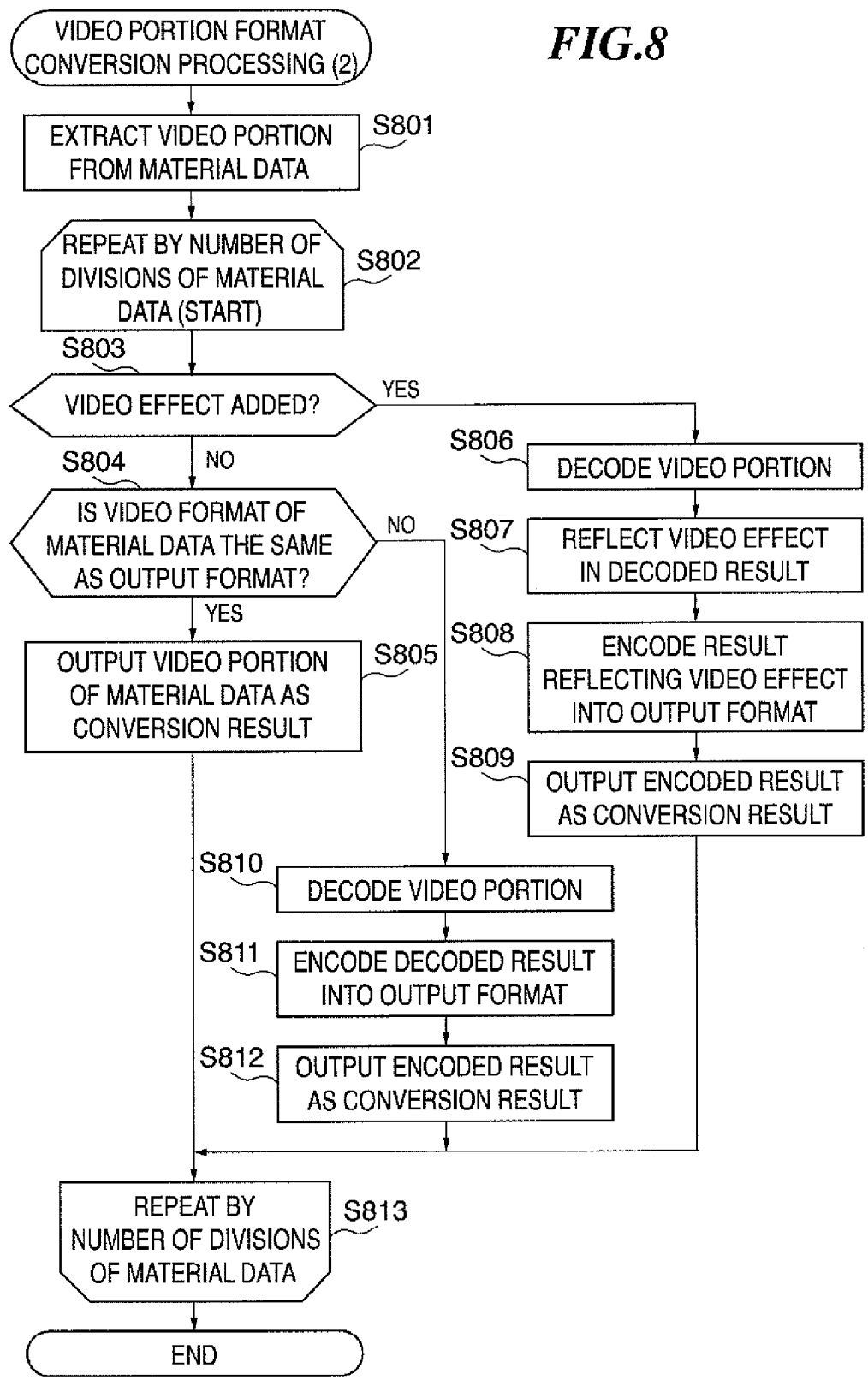
FIG. 8 is a second flowchart showing the procedure of video portion format conversion processing performed by the format conversion unit in FIG. 2.
Figure 9:
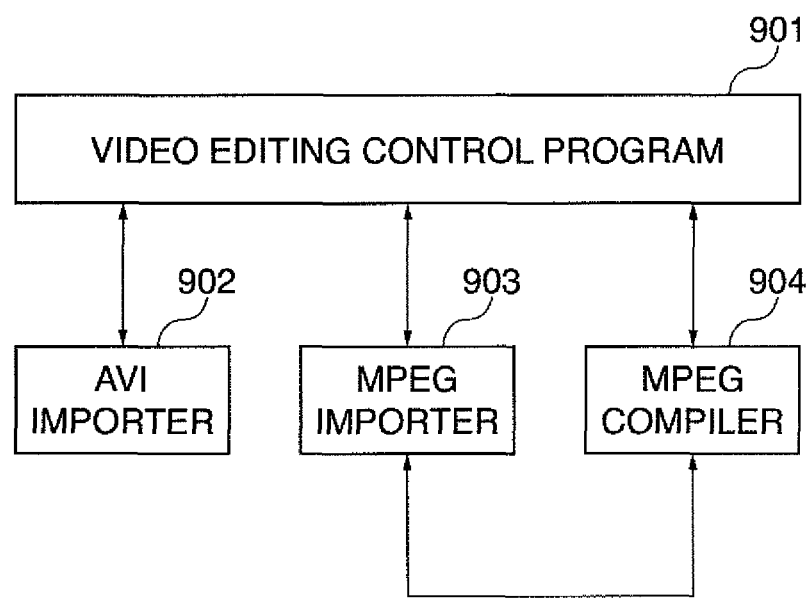
FIG. 9 is a diagram schematically showing the configuration of a moving image playback device related to a prior art example.

Since the processing flows on the video portion and the audio portion are almost the same, only the processing on the video portion will be described in details with reference to FIG. 8. In FIG. 8, a flow in which one of the material data is entered, and converted into a save format is shown; when a plurality of material data are handled, the processing is repeated by the number of material data.

FIG. 8 is a second flowchart showing the procedure of video portion format conversion processing performed by the format conversion unit in FIG. 2.

In FIG. 8, in step 801, only a video portion is extracted from the material data. Successively, in steps S802 to S812, the generation of the format conversion result is repeated according to the content of the effect instruction by the effect instruction unit 707. In this repeat, format conversion is sequentially performed on each of portions of the material data temporally divided into an effect addition portion and a non-addition portion by the effect instruction unit 707.

For example, if an effect has been instructed by the effect instruction unit 707 on only the first half of some material data, the format conversion unit 704 outputs the format conversion result in the first half and second half order. In addition, if an effect has been instructed by the effect instruction unit 707 on only a portion in the middle of some material data, the format conversion unit 704 outputs the format conversion result in the first part, middle part, and last part order.

In step S803, it is determined whether or not a video effect is added to the entirety or a portion of the material data to be processed. When the video effect is added, the processing proceeds to step S806, otherwise, the processing proceeds to step S804.

In step S806, the data of the video portion of divided material data is decoded to generate baseband data. In step S807, the video effect is reflected in the baseband data generated in step S806.

In step S808, the result reflecting the video effect is encoded so as to match the save format. Here, the types of formats to match are an encoding scheme, an image size, and a frame rate, as described above.

In the encoding in Step 808, depending on the save format, when encoding is performed with a frame rate that is different from that of the material data, sometimes the minimum time unit may change, and moving image data with a different playback time than that of the material data may be generated.

In this case, by generating moving image data in which the final frame is repeated twice, moving image data having the playback time equal to or longer than that of the material data is generated. In step S809, the encoding result generated in step S808 is outputted as the result of format conversion. This is repeated by the number of divisions of the material data (step S813), followed by terminating the processing.

In step S804, the processing branches using the determination result of the format determination unit 703. When it is determined that the format of the video portion of the material data matches the save format, the processing proceeds to step S805, otherwise, the processing proceeds to step S810.

In step S810, the data of the video portion of divided material data is decoded to generate baseband data. In step S811, the decoded result in step S810 is encoded so as to match the save format.

The processing in step S810 is the same as the encoding processing in step S808, and also adjusts the playback time as necessary. In step S812, the encoding result generated in step S811 is outputted as the result of format conversion. This is repeated by the number of divisions of the material data (step S813), followed by terminating the processing.

In addition, in step S805, the video portion itself of the material data is outputted as the format conversion result. This is repeated by the number of divisions of the material data (Step S813), followed by terminating the processing.

With the above procedure, when the format of the video portion of the material data matches the save format, the video portion itself of the material data can be outputted, and otherwise, decoding and encoding can be performed to generate and output the moving image data in the save format.

In addition, the added video effect can be reflected. Moreover, when the similar processing is additionally performed also on an audio portion, the difference in the playback time with the material data can be confined to less than one frame.

However, although the minimum time unit of the audio portion is finer than that of the video portion, the processing is performed so as to match the minimum time unit of the save format of the video portion, thus allowing the playback time to be the same for the audio portion and the video portion.

The joining unit 705 joins the format conversion results of the video portion and the audio portion of each material data, which are outputted from the format conversion unit 704, to generate save data. The function and the operation are the same as those of the joining unit 205 described in the first embodiment.

The above processing is performed sequentially, thus allowing the smart rendering to be provided whereby the variation of the playback time is minimized even if the video effect or the audio effect is added by an edit task.

The moving image editing device of the present embodiment comprises a material format acquisition unit, which acquires a material format, which is the moving image format of the material data. In addition, the moving image editing device also comprises a format determination unit, which determines whether or not the material format acquired by the material format acquisition unit matches the save format, which is the moving image format to be saved. The moving image editing device also comprises a format conversion unit, which converts the material data into the save format, and a joining unit, which sequentially joins the moving image data acquired by the format conversion unit to generate moving image data, which is the save result.

Then the format conversion unit outputs a portion or the entirety of the material data itself regarding the material data determined to be matched by the format determination unit. Further, the format conversion unit outputs data encoded into save format after decoding a portion or the entirety of the material data regarding the material data determined not to be matched. The joining unit repeats sequential joining so that the difference in the playback time with the material data may be minimized.

The format conversion unit and the joining unit have the above functions, thus allowing the smart rendering to be achieved whereby the variation of the playback time is minimized even when editing the material data with a minimum time unit that does not match that of the save format.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-233994 filed 30 Aug. 2006, which is herein incorporated by reference in its entirety.

What is claimed is:

1. A moving image editing device that sequentially joins a plurality of material moving image data to thereby generate a single joined moving image data, the moving image editing device comprising:
a processing device; and
a memory device connected to the processing device, the memory device storing a program executable by the processing device, the program comprising:
conversion instructions configured to convert one of a plurality of material moving image data with respect to format;
setting instructions configured to set a portion to be joined among the converted material moving image data; and
first adding instructions configured to obtain a first sum of a playback time of the not-yet converted material moving image data and a total playback time of a joined material moving image data;
second adding instructions configured to obtain a second sum of a playback time of the converted material moving image data and a total playback time of the joined moving image data;
determination instructions configured to determine whether or not a difference between the first sum and the second sum is less than a predetermined value; and
joining instructions configured to join the converted material moving image data to the joined moving image data, wherein the joining instructions are configured to:
join the converted material moving image data to the joined moving image data when the difference between the first sum and the second sum is less than the predetermined value, and
join the set portion of the converted material moving image data to the joined moving image data when the difference between the first sum and the second sum is not less than the predetermined value, and
wherein the setting instructions are configured to set the portion to be joined so that a difference between the first sum and a third sum of a playback time of the portion of the converted material moving image data and a playback time of the joined moving image data is less than a predetermined value.

2. A moving image editing device according to claim 1, wherein the joining instructions are configured to repeat a frame among the joined moving image data such that the second sum is greater than the first sum.

3. A moving image editing device according to claim 1, wherein:
the converting instructions are configured to convert a format of the material moving image data to the same format as the joined moving image data, and
the type of the format is at least one of an encoding scheme, an image size, or a frame rate.

4. A moving image editing device according to claim 1, wherein the predetermined value is one frame or one Group of Pictures (GOP).

5. A moving image editing method of sequentially joining a plurality of material moving image data to thereby generate a single joined moving image data, the method comprising:
a conversion step of converting one of a plurality of material moving image data with respect to format;
a setting step of setting a portion to be joined among the converted material moving image data; and
a first adding step of obtaining a first sum of a playback time of the not-yet converted material moving image data and a total playback time of a joined material moving image data;
a second adding step of obtaining a second sum of a playback time of the converted material moving image data and a total playback time of the joined moving image data;
a determination step of determining whether or not a difference between the first sum and the second sum is less than a predetermined value; and
a joining step of joining the converted material moving image data to the joined moving image data,
wherein the joining step comprises:
joining the converted material moving image data to the joined moving image data when the difference between the first sum and the second sum is less than the predetermined value, and
joining the set portion of the converted material moving image data to the joined moving image data when the difference between the first sum and the second sum is not less than the predetermined value, and
wherein the setting step comprises setting the portion to be joined so that a difference between the first sum and a third sum of a playback time of the portion of the converted material moving image data and a playback time of the joined moving image data is less than a predetermined value.

6. A non-transitory computer readable storage medium storing a moving image editing program which causes a computer to execute a moving image editing method of sequentially joining a plurality of material moving image data to thereby generate a single joined moving image data, the moving image editing program comprising:
- conversion instructions configured to convert one of a plurality of material moving image data with respect to format;
- setting instructions configured to set a portion to be joined among the converted material moving image data; and
- first adding instructions configured to obtain a first sum of a playback time of the not-yet converted material moving image data and a total playback time of a joined material moving image data;
- second adding instructions configured to obtain a second sum of a playback time of the converted material moving image data and a total playback time of the joined moving image data;
- determination instructions configured to determine whether or not a difference between the first sum and the second sum is less than a predetermined value; and
- joining instructions configured to join the converted material moving image data to the joined moving image data, wherein the joining instructions are configured to:
join the converted material moving image data to the joined moving image data when the difference between the first sum and the second sum is less than the predetermined value, and
join the set portion of the converted material moving image data to the joined moving image data when the difference between the first sum and the second sum is not less than the predetermined value, and wherein the setting instructions are configured to set the portion to be joined so that a difference between the first sum and a third sum of a playback time of the portion of the converted material moving image data and a playback time of the joined moving image data is less than a predetermined value.

* * * * *